United States Patent [19]

Herrington et al.

[11] 4,209,475

[45] Jun. 24, 1980

[54] METHOD AND APPARATUS FOR EFFECTING UNIFORM FILM THICKNESS

[75] Inventors: F. John Herrington, Holcomb, N.Y.; Alvin J. Stein, Jacksonville, Ill.

[73] Assignee: Mobil Oil Corporation, New York, N.Y.

[21] Appl. No.: 953,302

[22] Filed: Oct. 20, 1978

[51] Int. Cl.² ............................................. B29F 3/08
[52] U.S. Cl. ............................... 264/40.1; 264/40.3; 264/40.6; 264/519; 264/569; 425/72 R; 425/141; 425/326.1
[58] Field of Search ..................... 264/519, 563–565, 264/237, 40.3, 40.1, 40.6, 569; 425/72, 140–141, 326.1

[56] References Cited

U.S. PATENT DOCUMENTS

| | | | |
|---|---|---|---|
| 2,926,384 | 3/1960 | Hertz et al. | 425/72 |
| 2,952,874 | 9/1960 | Doyle | 425/72 |
| 3,125,616 | 3/1964 | Cook et al. | 264/40.3 |
| 3,548,042 | 12/1970 | Hinrichs | 264/237 |
| 3,835,209 | 9/1974 | Karabedian | 425/326.1 |

Primary Examiner—Jeffery R. Thurlow
Attorney, Agent, or Firm—Charles A. Huggett; Ronald J. Cier

[57] ABSTRACT

The uniformity of the gauge profile of thermoplastic sheet material is improved by means of a method comprising the detection of areas of non-uniform thickness in the sheet after drawing it away from the extrusion die and the redirection of a controlled portion of the cooling fluid by means of adjustable deflector blades which extend into the flowing stream of cooling fluid and alter the angle at which the cooling fluid contacts and quenches the molten extrudate, thereby allowing additional stretching of thick areas or earlier solidification of thin areas, as appropriate to the problem at hand.

3 Claims, 4 Drawing Figures

U.S. Patent  Jun. 24, 1980  Sheet 2 of 2  4,209,475
FIG. 3
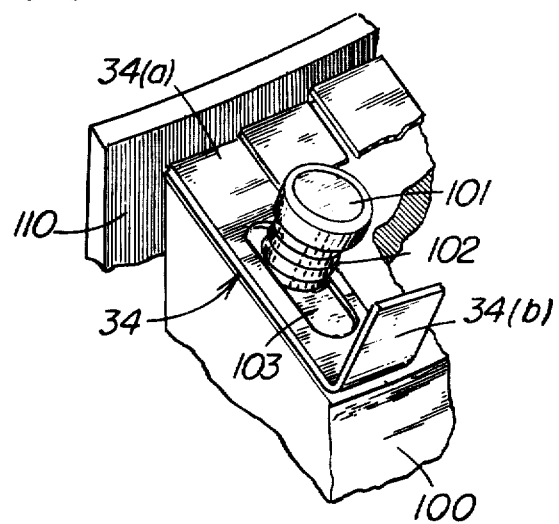
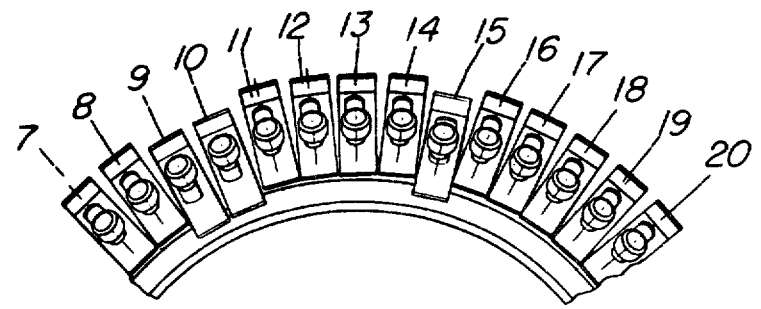
FIG. 4

METHOD AND APPARATUS FOR EFFECTING UNIFORM FILM THICKNESS

BACKGROUND OF THE INVENTION

1. Field of the Invention

This invention relates to the formation of a continuous extrudate of thermoplastic resin. More particularly, it is concerned with controlling and reducing thickness variation in such continuous extrudate.

2. Description of the Prior Art

The extrusion of thermoplastic materials thru an annular die orifice to form seamless tubular plastic, such as for the manufacture of film, tubing, pipes and the like, is well known. It has frequently been found desirable to contact the molten or semimolten material leaving the extrusion die with a stream of cooling fluid to regulate the rate of cooling and solidification, thereby controlling the properties of the final product.

To obtain a product having substantially uniform properties, and particularly one having uniform gauge profile, it has long been considered of prime importance that the rate of cooling be completely uniform around the entire circumference of the extruded tube. Hence, numerous devices have been designed and built with the intent of providing uniform cooling by controlling the uniformity of the rate of flow of the cooling fluid around the periphery of the extruded material. For example, U.S. Pat. No. 2,952,874 discloses an air ring having internal baffles, the object of which is to provide for a substantially uniform air velocity around the inner orifice of the air ring, while U.S. Pat. No. 3,548,042 discloses an apparatus utilizing fixed vanes inside the cooling ring to cause the cylindrical wall of cooling air surrounding the extruded tubing to rotate. Another device, described in U.S. Pat. No. 2,926,384, places moveable interfitting blocks within the annular air chamber of the cooling ring to effect close regulation of the flow of the cooling fluid immediately before it emerges from the ring to strike the extruded article.

However, good gauge profile uniformity also requires that the die and cooling ring be very clean and in good condition. In most actual plant operations, the gauge profile is less than optiumum because of errors in the equipment, and it is nearly impossible to maintain the equipment well enough to avoid these errors. It has heretofore been the common practice to compensate for such equipment errors, which inevitably show up down stream in terms of poor gauge uniformity in the extruded product, by making adjustments in the extrusion die. This method of compensation is, unfortunately, substantially less than ideal because die adjustments are made entirely by feel so that it is difficult for the operator to observe exactly what amount of mechanical change has been made and, since it may take a substantial amount of time for the line to stabilize after a die adjustment, the results of the change are not apparent for some time. Moreover, any die adjustment affects a wide area of the extruded tube, making it impossible to correct narrow errors in gauge uniformity.

SUMMARY OF THE INVENTION

A method has now been discovered for bringing about substantial improvement in gauge profile uniformity with only minor and inexpensive modification of existing equipment. The molten thermoplastic resin is extruded in the conventional manner to form a continuous article, preferably a tubular film, which is drawn away from the die lips while causing a stream of quenching fluid to contact the molten or semimolten extrudate to help solidify the resin. At some point downstream from the quenching operation, the solidified resinous article is monitored to detect any areas of non-uniform thickness, that is areas which are thicker or thinner than the allowed deviation from the desired nominal thickness specification for that article. When an undesirable deviation is encountered that portion of the quenching fluid which helps cool and solidify the resin in the vicinity at which the deviation originates is redirected to create a localized turbulence and cause it to impinge upon the extrudate at a somewhat increased or decreased angle of contact, as appropriate to correct the problem at hand. A relatively narrow section of the extrudate can thereby be solidified at a slightly faster (or slower) rate than the rest, with the result that the section is stretched less (or more) to correct the undesirable deviation.

A simple but highly responsive device for accomplishing this control of the quenching fluid stream comprises a series of independently moveable blades mounted peripherally around the circumference of the stream of quenching fluid. Each blade is individually projectable into the path of the stream at a point between its source, i.e. the cooling ring, and the point of contact of the stream with the extrudate. Each blade, when projected into the stream, will divert a narrow portion of the flowing quenching fluid to create the desired amount of turbulence and change the angle of contact between that portion of the quenching fluid and the corresponding section of extrudate.

BRIEF DESCRIPTION OF THE DRAWINGS

The invention shall hereinafter be described in greater detail with reference to the appended drawings in which:

FIG. 3 is an enlarged detail showing one of the moveable blades; and

FIG. 4 is a sectional view of the embodiment of FIG. 1 showing the operation of the blades.

DETAILED DESCRIPTION OF SPECIFIC EMBODIMENTS

Figures 1, 2:
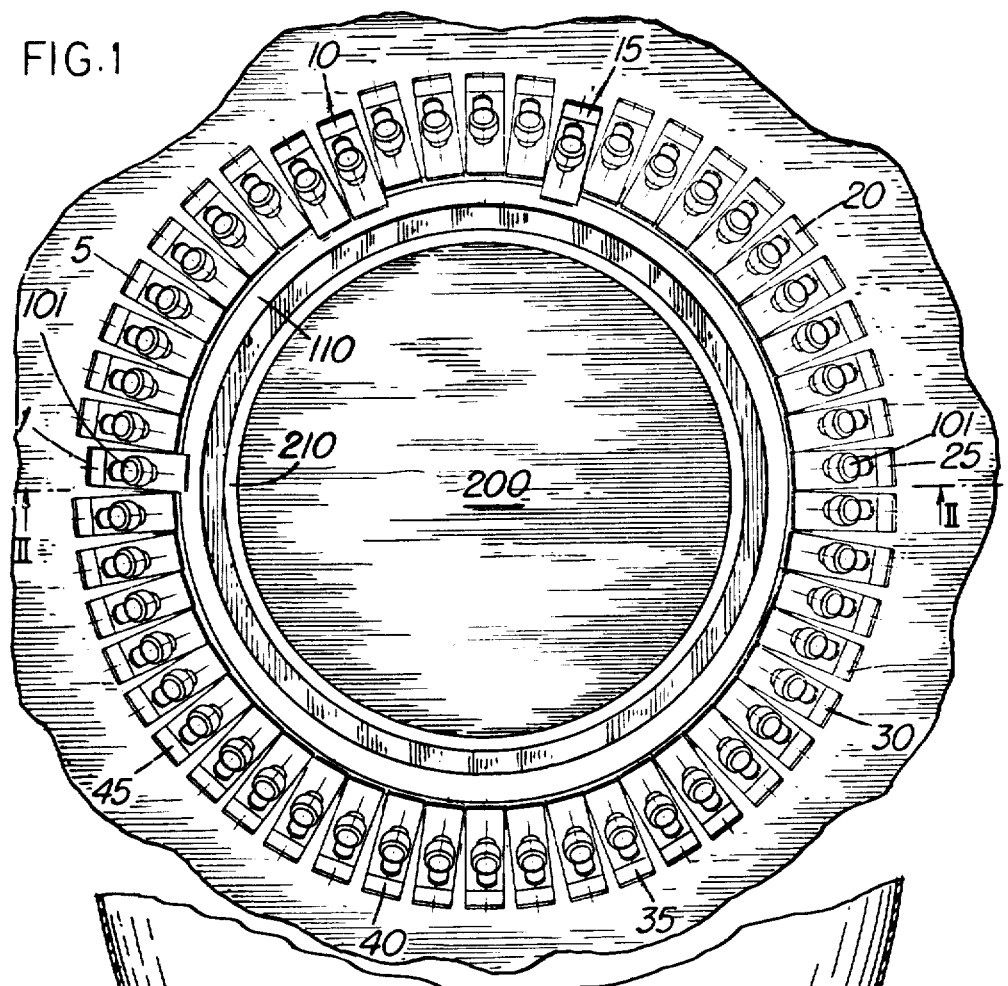
FIG. 1 is a top view of an embodiment of the apparatus disclosed herein showing the moveable blades mounted around the circumference of a cooling ring.
FIG. 2 is a side elevation taken along line II—II of FIG. 1.

In the embodiment of the invention shown in the drawings, a series of moveable deflector blades 1 thru 50 are mounted on the upper surface of cooling ring 100 around the outer perimeter of annular air passage 110. Each of the blades is independently moveable and is attached by means of a retaining pin 101. Although the illustration depicts an apparatus utilizing fifty adjustable blades spaced substantially symmetrically around the cooling ring, it is to be understood that this is merely one illustrative configuration of the herein disclosed device. There are, of course, many possible arrangements of the components involved which will provide essentially the same function as the configuration shown in the drawings— for instance: a greater or lesser number of adjustable blades, depending on the size of the cooling ring and the individual blades themselves; blades having tapered, splayed or squared forward sections; a relatively small number of blades mounted on a circular track to allow positioning of any of the blades at any given point about the circumference of the cooling ring; and so forth. These and other variations on the central theme encompassed herein will occur to one skilled in the art upon consideration of this disclosure and it is, of course, to be understood that such variations are merely modifications of the embodiment shown in the drawings which perform the same or equivalent function as that described below.

Turning for the moment to FIG. 3, the general construction and operation of one of the deflector blades (in this case, deflector blade 34 of FIG. 1) can be quickly explained. Blade 34 is illustrated as being of a flat, generally rectangular configuration. The leading edge 34(a) of the blade is substantially straight and the body of the blade planar except for the rear or following portion 34(b). Rear portion 34(b) is upwardly extending to provide a convenient gripping surface to aid in adjusting the position of the blade. The body of blade 34 contains an elongated opening or slot 103 thru which extends retaining pin 101. Pin 101 is securely attached to the blade mounting member (which in the drawings comprises the body of cooling ring 100) by means of its threaded end portion which couples with a matching threaded hole in the mounting member (see FIG. 2). The retaining pin preferably contains a shoulder or bulge in its upper section which will not pass thru slot 103. The embodiment illustrated also has a tensioning spring 102 to provide for friction retention of the blade and ease of adjustment without loosening the retaining pin, but this of course is optional.

The mounting of blade 34 is such that when the blade is pulled rearwardly to the maximum extent allowed by slot 103, and the retaining pin 101 is securely tightened down, the blade is held firmly in place and does not extend beyond the outer perimeter of annular air passage 110 nor into the stream of quenching fluid emanating from passage 110. By loosening pin 101 somewhat, blade 34 can be moved forward to allow leading edge 34(a) to project into the space above passage 110 and deflect a portion of the stream of quenching fluid flowing therefrom. The blade may be held at any desired degree of extention beyond the perimeter of passage 110 merely by tightening the retaining pin 101 once the blade has been positioned.

Although each blade will deflect only a relatively narrow width of the quenching fluid stream, it can be seen from FIG. 1 that by positioning a multiplicity of these deflector blades around the cooling ring a high degree of localized control and sensitivity can be obtained. This has the advantage of enabling the operator to correct narrow areas of incomformity in the thickness of the extrudate without negatively effecting adjacent areas. Similar control might be accomplished by mounting a smaller number of deflector blades, for instance five to ten, and their retaining pins on a circular track around the outside perimeter of passage 110 so that each of the blades may be moved laterally to allow positioning at any desired point around the circumference of the quenching stream. In such an embodiment, of course, the retaining pins would be of a type which would fasten to the track instead of individual threaded holes in the mounting member and the track would be separately attached to the mounting member, but such modifications of the fastening means are simply mechanical expediencies well within the skill and knowledge of the practicing craftsman.

The deflector blade mounting member may, as in the drawings, comprise the surface of the cooling ring 100. Alternately, a separate blade support means may be utilized for mounting the moveable deflector blades. When such separate support means is employed, it may rest directly on top of the cooling ring or may be positioned above the cooling ring, intermediate between the exit opening of the quenching fluid channel and the point at which the fluid stream contacts the molten or semimolten extrudate.

The method of the present invention will be explained, with reference to FIGS. 1 and 2, by means of a hypothetical operation involving the extrusion of a tubular film 300 from conventional tubular extrusion die 200. Although the example is essentially hypothetical, it will generally parallel situations actually encountered and will amply demonstrate the objective of the invention—i.e. to improve the uniformity of cross-sectional thickness or gauge profile in the extruded article.

Molten thermoplastic resin is fed from a conventional extruder (not shown) to tubular extrusion die 200 and is extruded thru annular die orifice 210 in the form of a tubular extrudate 300. The tubular extrudate 300 is drawn away from the lips of die orifice 210, inflated in the conventional manner, and subjected to whatever conventional downstream operations are deemed desirable and appropriate, for instance stretching, heat setting, slitting, folding, gussetting, printing, etc. (not shown). Cooling ring 100, which is positioned on or above die 200, delivers quenching fluid 120 thru fluid channel 110 to cool and solidify the molten or semimolten resin as it is drawn away from the die.

At some point in the operation, subsequent to the extrudate being cooled and drawn away from the die lips, a station (not shown) is established for monitoring the gauge profile of the film. Such monitoring station may be simply visual observation by a skilled operator or may be an elaborate automatic or semiautomatic mechanical or electronic device which alerts the operator to the most minute variation in thickness. Suitable monitoring means include, for instance, measurement by the operator of the thickness of various points around the periphery of the film tube using a hand micrometer, running a transverse strip of film through an electronic profilometer, or a beta ray scanning gauge operating continuously on line.

When an undesirable variation from the tolerance established for the thickness of the product is detected, for instance a narrow width which is less than the specified thickness at the section of the extrudate which, when followed back to its source at the lips of the extrusion die, would correspond at 9 o'clock on FIG. 1, it must be corrected. In order to correct this deviation the operator would want to cool and solidify that particular section of extrudate a little sooner than the rest so that, as the tube is inflated and stretched, that section will be stretched less than it had been. To accomplish this he would loosen retaining pin 101 on deflector blade 1, slide blade 1 forward until it extends over the exit end of quenching fluid channel 110, and then tighten retaining pin 101 back down to hold blade 1 in its new position. As will be seen from FIG. 2, the repositioned blade 1 intersects the stream of quenching fluid as it leaves the cooling ring and deflects some or all of it in that immediate vicinity. This deflection creates a localized turbulence and redirects some of the flowing fluid stream so that it strikes the extrudate sooner than it otherwise would have—compare, for instance, the path of quenching fluid 120 (in FIG. 2) in the vicinity of blade 1 with its path in the vicinity of blade 25 on the opposite side of the ring. The net result is to solidify that area of extrudate a little sooner so that it is not stretched to the extent it had been.

By adjusting the deflector blade so that it intersects the stream of quenching fluid to a greater or lesser extent (i.e.—creates a greater or lesser amount of turbulence), the operator can make very subtle changes in the cooling pattern and correct even small deviations with great sensitivity. Unlike die adjustments which take a long time to stabilize, the correction made via repositioning of the deflector blades is immediately apparent any may be quickly and easily adjusted if needs be without lengthy and costly interruption in the operation of the line.

Correcting areas of increased thickness would be handled in a somewhat different manner. For instance, suppose a ridge is detected at the monitoring station in the section of film corresponding to approximately 12 o'clock in FIG. 1. In order to correct this deviation the objective would be to cause the extrudate in the area forming the ridge to stretch out a little more. One way to accomplish this might be to solidify the resin on one or both sides of the ridge slightly sooner so that these areas resist stretching somewhat more than they had previously. This would have the tendency to redistribute the substantially constant mechanical stretching forces and thus cause adjacent areas of the film (e.g. the area forming the ridge) to stretch out a little more. FIG. 4 illustrates a possible respositioning of the deflector blades 9, 10, and 15 which might be employed to correct a thick area of the film originating in the vicinity of, say, blades 12 or 13.

By appropriate manipulation of individual blades or combinations of blades, a skilled operator can effect either gross or subtle changes in the gauge profile of the extrudate to quickly and efficiently correct any deviations from the thickness specifications he detects. This relatively simple but very versatile apparatus and method gives him a very effective tool for improving the quality of the extruded product while significantly reducing downtime and product waste.

Another application of the hereindisclosed invention would be to supplement or replace the physical control of the various elements thereof by the usual human operator with a partially or totally automated system. For instance, one might provide for motorized adjustment of the individual deflector blades, with the motors being responsive to or controlled by signals obtained from an on-line beta-ray scanning device which constantly monitored the gauge profile of the extrudate. Means suitable for effecting such automatic adjustment and control are well within the skill of those knowledgeable in the design and construction of the pertinent machinery and should impose no substantial obstacle to achieving the desired degree of automation of the apparatus and method disclosed herein.

It is to be understood that the foregoing description is merely illustrative of the preferred embodiments and the principle behind the present invention. Many modifications and variations thereof may be made by those skilled in the art without departing from the spirit of the invention as disclosed herein and such are intended to fall within the scope of the following claims.

What is claimed is:

1. A method of producing extruded thermoplastic material having improved uniformity of thickness, said method comprising:
   (a) extruding molten thermoplastic resin material in the form of a continuous article;
   (b) drawing the extrudate away from the extrusion die while causing a stream of quenching fluid to contact said extruded material to solidify the thermoplastic resin;
   (c) detecting areas of non-uniform thickness in the solidified article; and
   (d) redirecting a portion of said stream of quenching fluid by projecting a moveable deflector blade therein, which blade intersects said stream and causes a localized turbulence in the vicinity of said intersection thereby causing said redirected portion of said stream to impinge upon said extruded material in the vicinity of said non-uniform thickness at an increased or decreased angle of contact and thereby readjust the quenching rate of the molten extrudate in the vicinity of said increased or decreased angle of contact.

2. The method of claim 1 wherein said extruded article is a tubular film.

3. In an apparatus for forming a continuous tubular article of plastic material, said apparatus comprising an annular extrusion die thru which molten thermoplastic resin is extruded, a cooling ring having a central opening therethru which ring is mounted in line with and subsequent to said extrusion die such that said molten extrudate passes thru said central opening thereof, and means for providing a stream of fluid cooling material, which fluid cooling material is substantially uniformly distributed around the circumference of said extrudate by said cooling ring and impinges on the surface thereof to solidify the molten or semi-molten resin as it is drawn away from said die, the improvement comprising:
   (a) a multiplicity of independently moveable blades mounted peripherally around the circumference of said central opening,
   (b) means for individually projecting selected blades into said stream of fluid cooling material after said stream emerges from said cooling ring and before it makes contact with said tubular extrudate such that each of said blades, when so projected, will divert a portion of said fluid stream to create a localized turbulence therein and change the angle of contact between that portion of said cooling fluid stream and said tubular extrudate, and
   (c) means for holding said selected blades in the desired position after they have been projected into said stream.

* * * * *